United States Patent

[11] 3,602,787

[72] Inventor Ernst Tuchen
Jerxen-Orbke, Germany
[21] Appl. No. 30,127
[22] Filed Apr. 20, 1970
[45] Patented Aug. 31, 1971
[73] Assignee Elektronik-Regelautomatik GmbH & Co. KG
Bielefeld, Hanfstrasse, Germany
[32] Priority Apr. 18, 1969
[33] Germany
[31] P 19 19 716.1

[54] SPEED-CONTROL SYSTEM FOR INDUCTION MOTOR
11 Claims, 3 Drawing Figs.
[52] U.S. Cl. .................................................. 318/227, 318/230
[51] Int. Cl. ................................................... H02p 5/40
[50] Field of Search ...................................... 318/227, 230, 231, 345

[56] References Cited
UNITED STATES PATENTS
3,320,506  5/1967  Humphrey ................. 318/227 X Primary Examiner—Gene Z. Rubinson
Attorney—Karl F. Ross ABSTRACT: A tachogenerator driven by the shaft of a squirrel cage motor generates an oscillation, of a magnitude and frequency proportional to the shaft velocity, from which a unipolar ripple voltage is derived for charging a storage condenser at a rate decreasing with slip speed. A synchronizing stage for each phase winding of the motor is unblocked in the rhythm of the supply voltage to produce, during each half-cycle, a trigger pulse for a respective thyristor of a pair of oppositely poled thyristors connected in series with the corresponding phase winding of the motor's stator; the timing of this trigger pulse, and therefore the interval of conductivity of the thyristor, is controlled by the charge of the storage condenser. The charging circuit of this condenser includes a transistor amplifier with a differentiating feedback connection intermittently blocking this amplifier during an "on" period, determined by the difference between the ripple voltage and an adjustable reference voltage, whereby the amplifier oscillates at a frequency many times higher than the supply frequency and the condenser is progressively charged to an extent depending upon the duration of that period.

INVENTOR:
ERNST TUCHEN
BY
Karl J. Ross
ATTORNEY

INVENTOR:
ERNST TUCHEN
BY
Karl F. Ross
ATTORNEY

INVENTOR:
ERNST TUCHEN
BY Karl F. Ross
ATTORNEY

SPEED-CONTROL SYSTEM FOR INDUCTION MOTOR

My present invention relates to a speed-control system for an induction motor of the single-phase or the multiphase type.

In my copending application Ser. No. 695,084 filed Jan. 2, 1968, now German Pat. No. 3,522,502, I have described the use of triggerable semiconductors such as controlled rectifiers (thyristors) in series with the several phase windings of a three-phase AC motor to control the intermittent energization thereof.

Attempts have been made in the past to control the speed of an induction motor with the aid of electronic gates, such as thyristors or triacs, maintained conductive over varying intervals during part of each cycle of the driving voltage to provide a torque just balancing the load at a predetermined angular velocity of the rotor. These efforts have met only with limited success in view of the difficulty of translating deviations from a desired rotor speed into command signals suitable for the triggering of such electronic gates. Another problem, especially in the case of three-phase motors, is the need for uniformly distributing the regulated current flow over the several stator windings to insure smooth operation.

It is, therefore, the general object of my present invention to provide means for solving the aforestated problems in a simple and efficient manner to stabilize the operating speed of an induction motor, in particular a brushless motor of the squirrel cage type.

A more specific object is to provide means in such a system for enabling speed selection in a wide range of angular velocities between almost zero and near-synchronous speeds.

It is also an object of this invention to provide a circuit arrangement affording gradual acceleration of such a motor to the selected speed, especially upon the initial application of power to the system.

To realize these objects I provide, in accordance with the present invention, an alternating-current generator coupled with the rotor of the induction motor to produce an oscillation of a magnitude and frequency varying with rotor speed, this oscillation being then rectified without filtering so as to give rise to a unipolar ripple voltage. A preferably transistorized amplifier, normally biased for conduction, receives this ripple voltage which, at its peaks, cuts off the amplifier to stop the charging of a storage means such as a capacitor. The latter, in turn, controls a timing circuit generating the gating signal for the stator winding or windings. This timing circuit is also controlled by a normally blocked synchronizing circuit which is connected to the source of driving voltage for periodic unblocking thereby during successive cycles; such unblocking establishes a connection from the storage means to the timing circuit, at least once per cycle, to generate the gating signal whenever the storage charge reaches a predetermined level.

The ripple voltage fed to the input of the amplifier is not only a measure of rotor speed but also precisely in step with its rotation. The crests and troughs of this voltage, therefore, follow one another at a rate directly proportional to the rotor speed, this rate being preferably so chosen as to be at least three times the supply frequency in the case of a three-phase motor when the rotor approaches the synchronous speed. Below a certain amplitude of the alternator output, thus at less than a predeterminable rotor speed, the peaks of this voltage will be insufficient to turn off the amplifier so that the storage capacitor will be continuously charged. This, in turn, causes a rapid buildup of the control voltage for the timing circuit so that the gating signal is produced early in the cycle and excess torque is available to accelerate the motor. This acceleration increases the amplitude of the ripple voltage with resultant intermittent deactivation of the amplifier and a reduced rate of charge for the storage condenser whereby the gating interval is progressively shortened. Finally, an equilibrium is reached at which, under unchanging load conditions, the rotor speed remains practically constant.

With a three-phase motor, for example, the synchronizing and timing circuits are each subdivided into three sections individually assigned to the gates of respective stator windings but controlled in parallel from the same amplifier circuit including a storage condenser common to all of these sections. This common control, together with the aforementioned preferred frequency ratio of at least 3:1 at near-synchronous speeds, leads to a uniform triggering of all the phase gates and a consequent even run of the motor.

In order to allow for adjustment of the desired operating speed, I prefer to include a source of variable reference voltage (e.g. a potentiometer) in the biasing circuit of the amplifier. A change in this reference voltage will then raise or lower the threshold at which the ripple voltage from the rotor-controlled alternator, e.g. a tachogenerator, begins to affect the operation of the amplifier.

According to another advantageous feature of my invention, the amplifier is provided with a reactive feedback circuit for periodically interrupting the charging path of the storage condenser as long as the amplifier is turned on, with a resultant pulsing of the amplifier output at a high cadence to make the condenser charge substantially proportional to the duration of the "on" period of the amplifier without the need for large energy-dissipating charging resistors. The feedback circuit may include a differentiation network blocking the first amplifier stage upon incipient conduction of the last stage whereby, owing to the finite sweepout time required for the cutoff of any transistor, an output pulse of predetermined width will be generated. As the pulse decays, the first stage again becomes conductive so that another pulse propagates through the several stages of the amplifier, and so on. With three transistor stages, for example, the amplifier can be made to oscillate with a frequency of about 100 kc. or more, thus on the order of 100 times the frequency of the driving voltage which normally will be of 50 or 60 c.p.s.

In order to trigger a thyristor-type gate and at the same time discharge the storage condenser preparatorily to a recharging thereof for the control of the next phase, I prefer to design the timing circuit essentially as a unijunction transistor with another capacitor in its input. This second capacitor, pursuant to a further advantageous feature of my invention, is also provided with an ancillary charging path controlled by the synchronizing circuit independently of the storage condenser in order to generate a gating signal even when this condenser is not charged, i.e. when the output of the tachogenerator is so high that the amplifier is continuously cutoff. Under these circumstances, however, the gating signal need not come into existence during every cycle since, especially with light loads, the stator requires only a fraction of the energy needed to bring the rotor up to its desired speed. The speed at which the system operates with exact phase symmetry, thus at optimum efficiency, may be selected to lie at approximately 10 percent to 20 percent below the synchronous speed.

The invention will be described in greater detail hereinafter with reference to the accompanying drawing in which.

Figure 1:
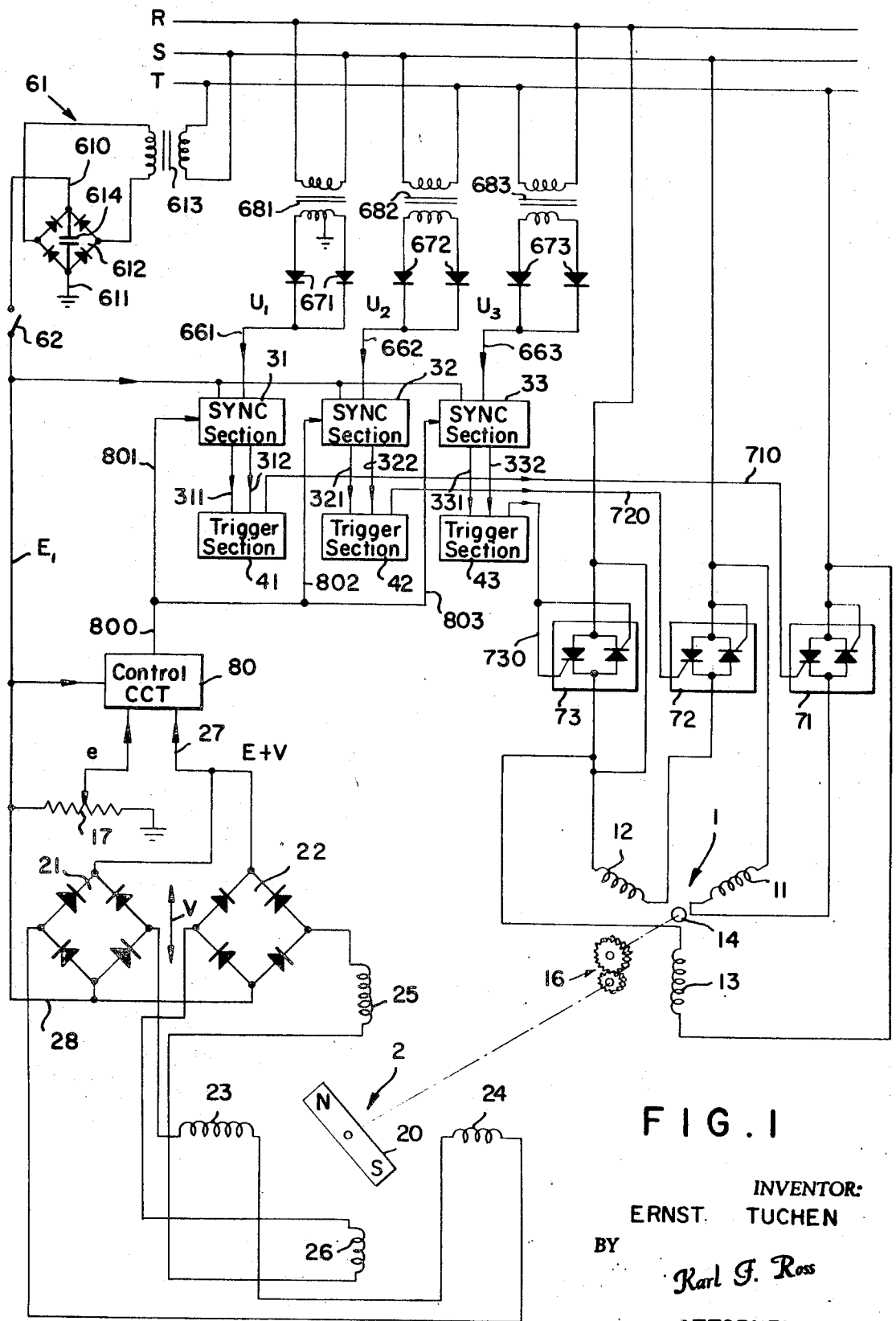
FIG. 1 is an overall circuit diagram of a speed-regulating system according to the invention.

In FIG. 1 I have shown an induction motor 1 with stator windings 11, 12, 13 and a squirrel cage rotor 14 having a shaft 15. A tachogenerator 2 comprises a rotatable permanent magnet 20 driven from shaft 15 via a set of gears 16 with a step-up ration of 1:3, this generator further having two pairs of windings 23, 24 and 25, 26 connected across full-wave rectifiers 21, 22 with a common positive output lead 27 and a common negative lead 28. The latter conductor, however, is normally connected by way of a circuit breaker 62 to the positive output terminal 610 of another rectifier bridge 612 having a grounded negative terminal 611. Bridge 612 forms part of a DC power supply 61 energized by a transformer 613 whose primary is bridged across two phase leads of a three-phase utility line R, S, T of, say, 60 c.p.s. In contradistinction to bridge 612 whose output E is filtered, as diagrammatically indicated by a condenser 614, bridges 21 and 22 provide an unfiltered or raw-rectified output hereinafter referred to as a ripple voltage V.

A potentiometer 17 connected between bus bar 28 and ground supplies an adjustable DC voltage $e$, less than E, to a control circuit 80 which also receives the voltages E and V. An output lead 800 of this control circuit is split into three branches 801, 802, 803 terminating at respective sections 31, 32, 33 of a synchronizing network also receiving the positive DC voltage E from bus bar 27. Each of these synchronizing sections has a further input connection 661, 662, 663 which delivers to it a pulsating phase voltage $U_1$, $U_2$, $U_3$ from the power supply R, S, T, this phase voltage being derived from a respective phase transformer 681, 682, 683 through an associated pair of rectifiers 671, 672, 673. The primary windings of these phase transformers are shown connected in $\Delta$ across respective pairs of conductors R, S, T. A similar $\Delta$ connection ties these phase conductors to the three stator windings 11, 12, 13 in series with respective electronic gates 71, 72, 73 each shown to comprise a pair of antiparallel thyristors whose gate electrodes are connected to respective output leads 710, 720, 730 of associated trigger-circuit sections 41, 42, 43 controlled from sync sections 31, 32, 33 through leads 311, 321, 331 and 312, 322, 332.

Figure 2:
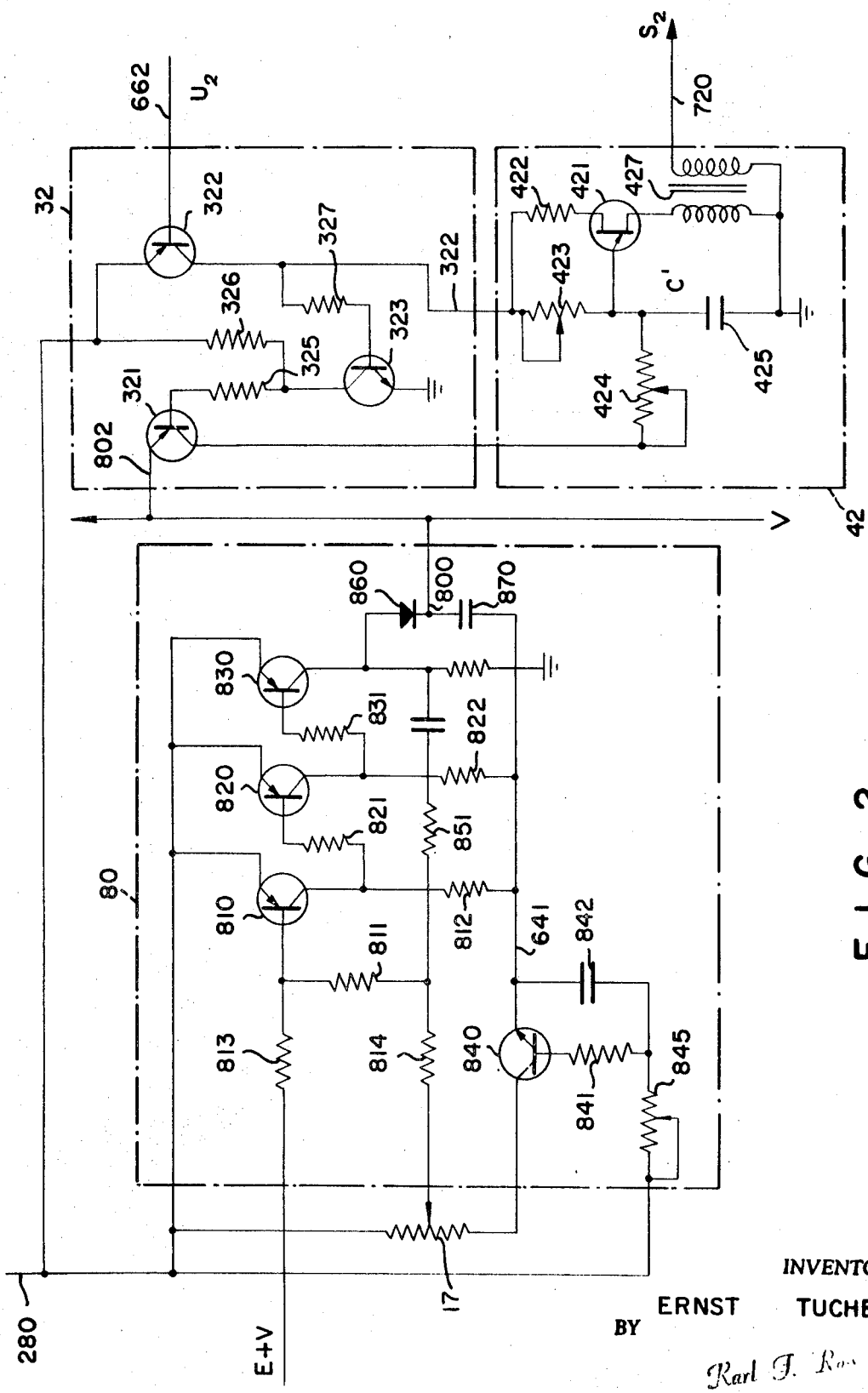
FIG. 2 is a more detailed diagram of some of the components of FIG. 1.

As illustrated in FIG. 2, control circuit 80 includes a three-stage amplifier consisting of three PNP transistors 810, 820, 830 connected between bus bar 28 and ground 611 in series with respective collector resistors 812, 822, 832, the base of the first transistor 810 being connected to the slider of potentiometer 17 through a pair of resistors 811, 814 and being further connected to conductor 27, carrying the ripple voltage V superimposed upon the steady voltage E, through a resistor 813. A reactive feedback connection, consisting of a condenser 850 in series with a resistor 851, extends between the junction of resistors 811, 813 and the collector of transistor 830. Other resistors 821 and 831 serve as interstage coupling impedances. The collector of transistor 830 is connected to ground through a storage capacitor 870 in series with a charging diode 860, the junction of these two impedance elements being connected to output lead 800. The negative end of potentiometer 17 is grounded through a normally conducting ancillary transistor 840 of NPN type whose base is tied to lead 28 through two series resistors 841 and 845, the latter being adjustable; the junction of these two resistors is returned to ground through a condenser 842.

Sync section 32, which is the only one shown in FIG. 2 and is also representative of companion sections 31 and 33, has an input transistor 321 of PNP type connected by its emitter to lead 802 and by its collector to lead 312 extending to the associated trigger section 42 which is also representative of its two companion sections. Another PNP transistor 322 has its collector tied to output lead 322 and its base to input lead 662; the emitter of this transistor is connected to ground through a resistor 326 in series with the collector-emitter path of an NPN transistor 323 having its base tied to lead 322 through a resistor 327. The collector of transistor 323 is also connected to the base of transistor 321 via a resistor 325.

Trigger section 42, which controls the timing of the energization of the corresponding stator winding 12 of motor 1 (FIG. 1), comprises a unijunction transistor 421 with one base connected to lead 322 through a resistor 424 and the other base grounded through the primary of an output transformer 427 feeding the outgoing conductor 720. The emitter of unijunction transistor 421 is connected to ground through another capacitor 425 and is also tied to the common terminal of two adjustable resistors 423, 424 inserted between leads 312 and 321.

Figure 3:
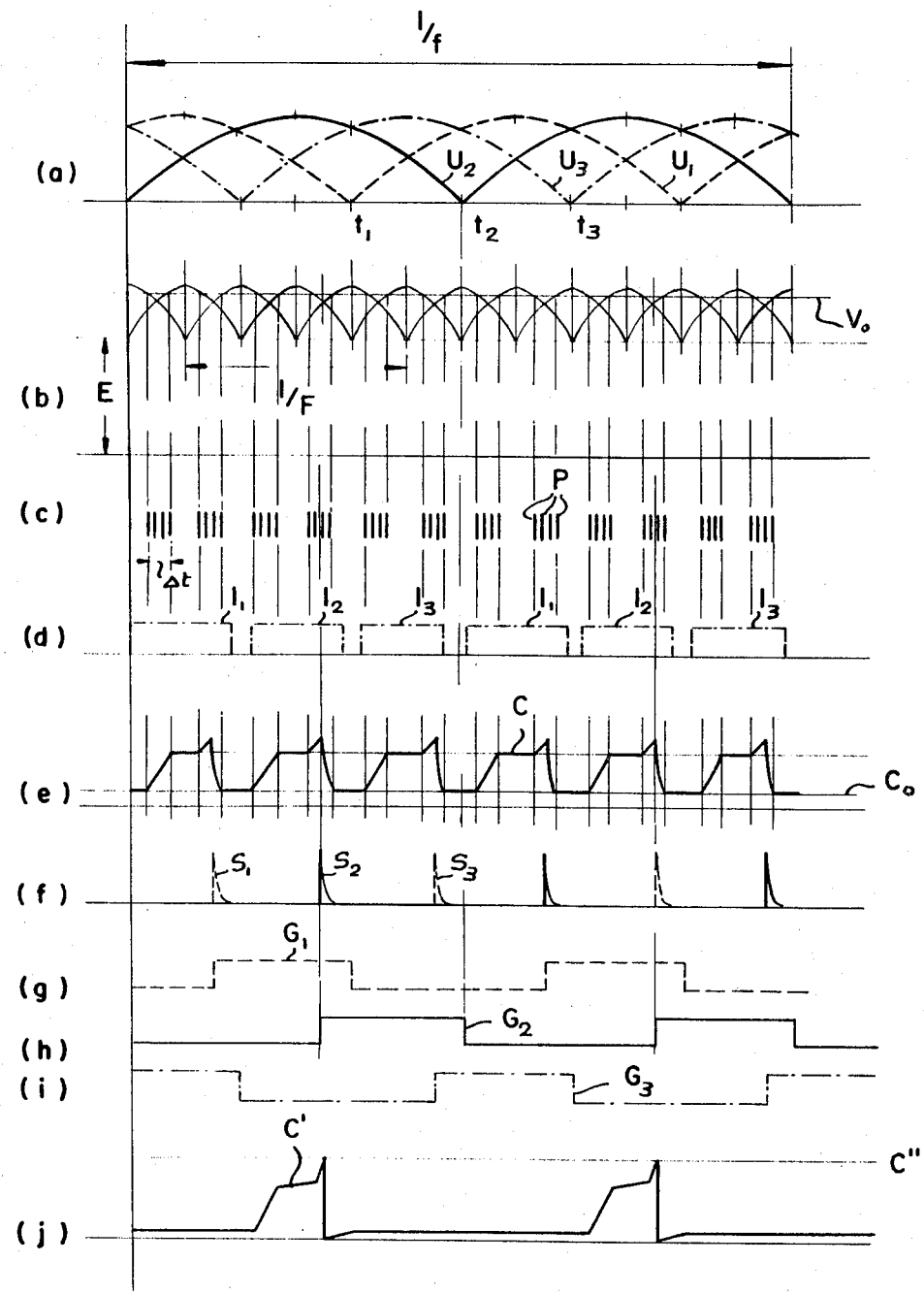
FIG. 3 is a set of graphs relating to the operation of the system.

I shall now describe the operation of this system with reference to FIG. 3 where graph ($a$) shows the three raw-rectified phase voltages $U_1$, $U_2$, $U_3$ whereas graph ($b$) illustrates the DC voltage E together with the superimposed ripple voltage V.

With a given setting of potentiometers 17, the base of transistor 810 is biased sufficiently negative to let the transistor 810 conduct in the absence of a countervailing positive voltage E+V on lead 27, the threshold for the cutoff of transistor 810 being indicated at $V_o$ FIG. 3($b$). Transistor 820 serves as an inverting stage between transistors 810 and 830, the latter transistor thus conducting whenever transistor 810 does. Upon such conduction, charging current flows into capacitor 870 through diode 860 as well as through resistor 832 in parallel therewith; the voltage rise across this resistor is differentiated by the circuit 850, 851 and is fed back to the base of transistor 810 as a blocking pulse interrupting the current flow through the amplifier. During the finite time required for this blocking pulse to cut off the third stage 830, a short pulse is generated in the output of that stage to raise the charge of capacitor 870 by a small increment. The termination of this pulse reactivates the amplifier so that a series of such pulses are created in rapid succession as long as the combined biasing potential applied to transistor 810 by potentiometer 17 and lead 327 lies below the threshold $V_o$. Thus, a train of short pulses P, FIG. 3($c$), is generated within an interval $\Delta t$ which starts when the voltage of graph ($b$) dips below the level $V_o$ and ends when that voltage rises above this level. In practice, the cadence of pulses P may be 100 or more times higher than the supply frequency $f$ indicated in graph ($a$).

The pulsating voltage $U_2$, applied to the base of transistor 322 by way of lead 662, unblocks this transistor for a fraction of a cycle whereby current flows over lead 322 into condenser 425; this current pulse has been illustrated in graph ($d$) of FIG. 3 and at $I_1$, $I_3$ for the other two sections 31, 33. Currents $I_1$ and $I_3$, like the corresponding voltages $U_1$ and $U_3$ in graph ($a$), have been indicated in dotted and dot-dash lines, respectively. Input transistor 322 also cuts in the intermediate transistor 323 which in turn activates the transistor 321 interposed between lead 802 and condenser 425. This condenser, therefore, is now charged over two separate paths, i.e. over leads 800, 802, 312 to an extent determined by the charge on capacitor 870 as well as the setting of resistor 424 and over lead 322 at a rate determined only by the setting of resistor 423. Over the first path the variable part of the charge of condenser 870 is transferred to condenser 425 whereas the current flow over the second path is independent of that charge and substantially constant throughout the period of conductivity of transistor 322. Eventually, the potential of condenser 425 reaches a level sufficient to fire the unijunction transistor 421 with resultant generation of a trigger pulse in output lead 720 and with the discharge of condenser 425.

Graph ($e$) of FIG. 3 shows at C the charge of condenser 870 which rises during the periods $\Delta t$, remaining substantially unchanged between these periods. During the existence of current pulse $I_2$, the charge C' of condenser 425 follows a similar course but also rises at a reduced rate between periods $\Delta t$ as illustrated in graph ($j$). Whenever the charge C' reaches the level C'' which causes the transistor 421 to conduct, both condensers 425 and 870 are discharged, with charge C dropping to a residual level $C_o$ determined by the circuit parameters. The firing signal $S_2$, graph ($f$), concurrently generated in transformer 727 gives rise to a gating pulse $G_2$, graph ($h$), which terminates at the instant $t_2$ when the corresponding phase voltage $U_2$ goes to zero. Corresponding firing signals $S_1$ and $S_3$ for the other two phases, also shown in graph ($f$), initiate respective gating signals $G_1$, graph ($g$), and $G_3$, graph ($i$), terminating at instants $t_1$ and $t_3$, respectively. Thus, the length of each gating pulse is variable in accordance with the duration of pulsing interval $\Delta t$ which determines the rise of condenser charges C and C'; these intervals, in turn, depend on both the amplitude and the frequency of ripple voltage V. The latter frequency F, indicated in graph ($b$), bears no fixed relationship with the supply frequency $f$ but has been shown in FIG. 3 as approximately equaling $3f$, a value which F reaches as the speed of rotor 15 (FIG. 1) approaches the synchronous speed of the motor 1.

From FIG. 3(b) it will be apparent that a substantial reduction in the amplitude of ripple voltage V, caused by a deceleration of rotor 14, would let the peaks of that voltage drop below the threshold $V_o$ whereby successive intervals $\Delta t$ would merge so that amplifier 810, 820, 830 would generate a continuous train of charging pulses P for condenser 870. In such a case, of course, the charge C' on condenser 425 would reach the breakdown level C" much earlier in a cycle then illustrated in FIG. 3(j), i.e. shortly after the inception of an unblocking interval represented by the current pulses of graph (d), so that the gating pulses $G_1$, $G_2$, $G_3$ will be correspondingly lengthened. Conversely, an appreciable increase in rotor speed would make the intervals $\Delta t$ disappear so that condenser 870 would not be charged at all whereas condenser 425 would charge only at a relatively slow rate via lead 322; in this case the condenser charge C' would reach the firing level C" only much later, e.g. several cycles after the generation of the last gating signal (e.g. $G_2$) for the corresponding phase, whereby the respective stator winding would be only sparingly energized. It should be noted, however, that the identity of the several timing circuits 41, 42, 43 and their associated synchronizing sections 31, 32, 33, along with their common control by the output of circuit 80, will in each instance insure a firing of gating thyristors 71, 72, 73 at similar intervals whereby the motor will run at an even velocity.

With the idealized frequency ratio $F{:}f{=}3{:}1$, illustrated in FIG. 3, the system will operate exactly symmetrically since the rise of the condenser voltages C, C' has the same phase relationship with each of the current pulses $I_1$, $I_2$, $I_3$. In practice, of course, this situation will not be exactly maintainable for any length of time but may usually be approximated by selecting the rotor speed at full load in the range of 10 to 20 percent less than synchronous speed. The residual energization of the stator windings at higher speeds, e.g. under idling conditions, is desirable to prevent a periodic velocity fluctuation which would otherwise occur as the rotor speed drops back to a level where the charging of condenser 870 is resumed, with resultant reacceleration, and so forth.

The ancillary transistor 840 of FIG. 2 is designed to prevent the control circuit 80 from overreacting when, with motor 1 at standstill, power is first connected to the system by closure of the circuit breaker 62. Upon closure, the application of positive voltage to bus bar 28 drives both the collector and the base of transistor 840 positive yet the rise in base potential is slowed by the bypass condenser 842 so that this potential builds up only gradually and at a rate determined by the adjustment of resistor 845. This corresponds to an equally gradual grounding of the negative terminal of potentiometer 17 with a corresponding lowering of the base voltage of amplifier stage 810 to bias this amplifier into conductivity. The resulting progressive charging of condenser 870 leads to slow acceleration of rotor 14 until the system has reached its steady-state condition.

It will thus be seen that I have provided a circuit arrangement which regulates the speed of an induction motor with close tolerances and which lets this speed be adjusted between wide limits. The variable setting of potentiometer 17 allows the establishment of threshold $V_o$ at a selected level corresponding to a desired slip speed under a given load. If the load changes, a manual or automatic readjustment of the potentiometer enables instant correction of any deviation from the desired rotor speed.

What I claim is:

1. A speed-control system for an induction motor having at least one stator winding and a rotor, comprising:

a source of alternating driving voltage for said stator winding;

electronic gate means in series with said winding;

an alternating-current generator coupled with said rotor for producing an oscillation of a magnitude and frequency varying with rotor speed;

raw-rectification means for converting said oscillation into a unipolar ripple voltage;

amplifier means provided with conduction-promoting biasing means and connected to said raw-rectification means for receiving said ripple voltage and for being rendered nonconductive during peaks of said ripple voltage exceeding a predetermined threshold;

storage means connected to be charged by said amplifier means during periods of conductivity thereof and to an extent depending upon the duration of said periods;

a normally blocked synchronizing circuit connected to said source for periodic unblocking during successive cycles; and timing means jointly controlled by said synchronizing circuit and by said storage means for generating a signal to open said electronic gate means during each cycle for an interval depending on the charge of said storage means.

2. A system as defined in claim 1 wherein said biasing means includes a source of adjustable reference voltage for varying said threshold.

3. A system as defined in claim 1 wherein said amplifier means is provided with a reactive feedback circuit for periodically interrupting the charging path of said storage means at a cadence substantially greater than the frequency of said driving voltage.

4. A system as defined in claim 3 wherein said cadence is on the order of 100 times the frequency of said driving voltage.

5. A system as defined in claim 3 wherein said amplifier means comprises a plurality of cascaded transistor stages, said feedback circuit including a resistive-capacitive differentiation network.

6. A system as defined in claim 1 wherein said electronic gate means comprises triggerable semiconductor means and said timing means comprises a trigger circuit for said semiconductor means connected to said storage means through said synchronizing circuit.

7. A system as defined in claim 6 wherein said storage means comprises a first capacitor and said trigger circuit includes a second capacitor connected to receive the charge of said first capacitor by way of said synchronizing circuit in the unblocked condition thereof.

8. A system as defined in claim 7 wherein said trigger circuit further includes a unijunction transistor with an input circuit connected across said second capacitor.

9. A system as defined in claim 8 wherein said second capacitor is further provided with an ancillary charging path controlled by said synchronizing circuit independently of said storage means.

10. A system as defined in claim 1 wherein said stator has three phase windings each provided with electronic valve means individual thereto, said synchronizing circuit and said timing means having each three sections respectively connected to said electronic valve means, said alternating-current generator having an operating frequency equal to at least three times the frequency of said driving voltage upon said rotor approaching synchronous speed, said storage means comprising a condenser common to all said sections.

11. A system as defined in claim 1 wherein said amplifier means is provided with an energizing circuit including a time-constant network for delaying an initial buildup of operating voltage therefor.

FO-1050
(5/69)

UNITED STATES PATENT OFFICE
CERTIFICATE OF CORRECTION

Patent No. 3,602,787          Dated  31 August 1971

Inventor(s) ERNST TUCHEN

It is certified that error appears in the above-identified patent and that said Letters Patent are hereby corrected as shown below:

In the drawing, the portion of FIG. 1 depicted immediately below

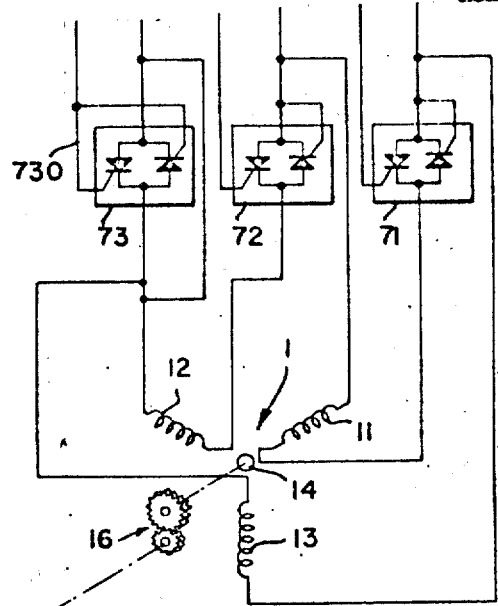

should appear as follows:

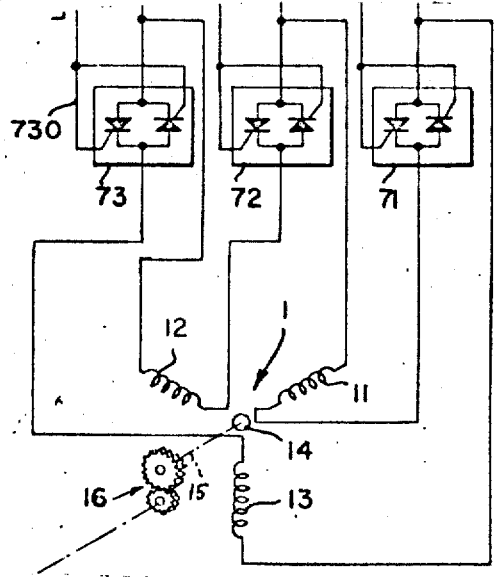

Signed and sealed this 11th day of April 1972.

SEAL)
Attest:

DWARD M. FLETCHER, JR.
Attesting Officer

ROBERT GOTTSCHALK
Commissioner of Patents